United States Patent
Ghidoni et al.

(10) Patent No.: US 7,825,165 B2
(45) Date of Patent: Nov. 2, 2010

(54) PROCESS OR IMPROVING THE INSULATING CAPACITY OF EXPANDED VINYL AROMATIC POLYMERS AND THE PRODUCTS THUS OBTAINED

(75) Inventors: Dario Ghidoni, Gonzaga (IT); Antonio Ponticiello, Mozzecane (IT); Alessandra Simonelli, Mantova (IT); Loris Zamperlin, Porto Mantovano (IT)

(73) Assignee: Polimeri Europa S.p.A., Brindisi (IT)

( * ) Notice: Subject to any disclaimer, the term of this patent is extended or adjusted under 35 U.S.C. 154(b) by 305 days.

(21) Appl. No.: 11/918,452

(22) PCT Filed: Apr. 13, 2006

(86) PCT No.: PCT/EP2006/003446

§ 371 (c)(1),
(2), (4) Date: Oct. 15, 2007

(87) PCT Pub. No.: WO2006/108672

PCT Pub. Date: Oct. 19, 2006

(65) Prior Publication Data

US 2009/0068354 A1    Mar. 12, 2009

(30) Foreign Application Priority Data

Apr. 15, 2005    (IT) ........................... MI05A000666

(51) Int. Cl.
*C08J 9/22* (2006.01)
(52) U.S. Cl. .............. 521/56; 521/57; 521/80; 521/146; 521/147; 521/148; 524/495; 524/496
(58) Field of Classification Search ............... 521/55, 521/57, 80, 146, 147, 148; 524/495, 496
See application file for complete search history.

(56) References Cited

U.S. PATENT DOCUMENTS

| 2,993,903 | A | 7/1961 | Krains |
| 3,631,014 | A | 12/1971 | Wright |
| 6,387,968 | B1 | 5/2002 | Glück et al. |
| 6,465,533 | B1 * | 10/2002 | Eberstaller et al. ............ 521/79 |
| 7,612,119 | B2 * | 11/2009 | Ponticiello et al. ............ 521/56 |
| 2004/0039073 | A1 | 2/2004 | Gluck |
| 2006/0276557 | A1 | 12/2006 | Ponticiello et al. |

FOREIGN PATENT DOCUMENTS

| EP | 0 126 459 B1 | 11/1984 |
| EP | 0 620 246 B1 | 10/1994 |
| JP | 61-171705 A | 8/1986 |
| JP | 2002-53605 A | 2/2002 |
| WO | WO 98/51734 A1 | 11/1998 |
| WO | WO 2004/087798 A1 | 10/2004 |

OTHER PUBLICATIONS

PCT/ISA/210.
PCT/ISA/237.
English translation of the Notification of Transmittal of the International Preliminary Report on Patentability ( The references identified in notice were filed in the first Information Disclosure Statement dated Oct. 15, 2007.
K. Ohkita, "The Free Radical Polymerization of Vinyl Monomers in the Presence of Carbon Black", vol. 13, 1975, pp. 443-448.
H.G.Yuan, "Suspension Polymerization", JMS-REV. Macromol. Chem. Phys., C31(2&3), 1991, pp. 215-299.

* cited by examiner

*Primary Examiner*—Peter D Mulcahy
(74) *Attorney, Agent, or Firm*—Buchanan Ingersoll & Rooney PC

(57) ABSTRACT

Process for improving the insulating capacity of expanded vinyl aromatic which comprises:
1) preparing beads of expandable vinyl aromatic polymers containing 1-10% by weight, calculated with respect to the polymer, of an expanding agent englobed in the polymeric matrix and 0.001-25% by weight, calculated with respect to the polymer (a), of an athermanous additive comprising carbon black homogeneously distributed in the polymeric matrix;
2) treating the surface of the beads, before deposition of the coating, with a liquid lubricating agent; and
3) thermally treating the beads with hot air at a temperature ranging from 30 to 60° C.

11 Claims, No Drawings

PROCESS OR IMPROVING THE INSULATING CAPACITY OF EXPANDED VINYL AROMATIC POLYMERS AND THE PRODUCTS THUS OBTAINED

The present invention relates to a process for improving the insulating capacity of expanded vinyl aromatic polymers and the relative products thus obtained.

More specifically, the present invention relates to a process for the preparation of expandable vinyl aromatic polymers which, after expansion, have a reduced thermal conductivity also at a low density, and the products thus obtained.

Even more specifically, the present invention relates to a process for improving the insulating capacity of expanded polystyrene (EPS) and the relative product thus obtained.

Expandable vinyl aromatic polymers, and among these, in particular, expandable polystyrene, are known products which have been used for a long time for preparing expanded articles which can be adopted in various applicative fields, among which one of the most important is the field of thermal insulation.

These expanded products are obtained by swelling in a closed mould beads of expandable polymer impregnated with a gas and molding the swollen particles contained inside the mould by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 30 g/l as the thermal conductivity of the polymer has a minimum at these values. It is not advantageous to fall below this limit, even if it is technically possible, as it causes a drastic increase in the thermal conductivity of the sheet which must be compensated by an increase in its thickness. To avoid this drawback, suggestions have been made to fill the polymer with athermanous materials such as alumina, as described in European patent 620,246, or carbon black as described in international patent application WO 2004/087798.

Published Japanese patent application JP 61-171,705 describes a method for preparing particles of polystyrene, also expandable, filled with carbon black which comprises the polymerization in aqueous suspension of styrene in the presence of bifunctional organic peroxides without the benzene ring and carbon black with dimensions of less than 100 nm. The process also comprises the addition, during or at the end of the polymerization, of an expanding agent, for example isopentane, whose concentration can vary from 1 to 6% by weight with respect to the polystyrene.

The radicalic polymeric reaction of vinyl monomers in the presence of carbon black is heavily delayed when peroxides containing benzene rings are used, as described in K. Ohkita, "Carbon", 13, 443-448, 1975, to such an extent that carbon black is even used as an inhibitor of peroxides containing benzene rings in the polymerization of styrene (U.S. Pat. No. 2,993,903).

International patent application WO 2004/087798 describes expandable styrene polymers filled with carbon black, capable of giving low density expanded materials with characteristics comparable to those of the materials obtained with methods of the known art, using peroxides normally adopted in polymerization in aqueous suspension of expandable polystyrene and consequently without having to use peroxides without benzene rings. It is therefore possible to obtain products based on vinyl aromatic polymers with a thermal conductivity also capable of satisfying class 035 of the regulation DIN 18164 Part 1, by incorporating therein a particular type of carbon black.

Said patent application describes expandable vinyl aromatic polymers comprising:
a) a matrix obtained by polymerizing 50-100% by weight of one or more vinyl aromatic monomers and 0-50% by weight of at least one copolymerizable monomer;
b) 1-10% by weight, calculated with respect to the polymer (a), of an expanding agent englobed in the polymeric matrix;
c) 0.01-20% by weight, calculated with respect to the polymer (a), of a carbon black filler homogeneously distributed in the polymeric matrix having an average diameter ranging from 30 to 2000 nm, a surface area ranging from 5 to 40 $m^2/g$, a sulfur content ranging from 0.1 to 1000 ppm and an ash content ranging from 0.001 to 1%.

According to this invention, the carbon black is also characterized by a loss with heat ranging from 0.001 to 1%, an iodine number ranging from 0.001 to 20 g/kg and an absorption value of dibutylphthalate (DBPA) ranging from 5 to 100 ml/(100 g).

The Applicant has now found a process for improving the insulating capacity of expanded vinyl aromatic polymers which comprises:
1) preparing beads of expandable vinyl aromatic polymers containing 1-10% by weight, calculated with respect to the polymer, of an expanding agent englobed in the polymeric matrix and 0.01-25% by weight, calculated with respect to the polymer (a), of an athermanous additive comprising carbon black homogeneously distributed in the polymeric matrix with an average diameter ranging from 30 to 2000 nm, a surface area ranging from 5 to 40 $m^2/g$, a sulfur content ranging from 0.1 to 1000 ppm, a content of ashes ranging from 0.001 to 1%;
2) treating the surface of the beads, before deposition of the coating, with a liquid lubricating agent selected from:
   i. a hydroxylated organic compound wherein the C/OH ratio, between the number of carbon atoms (C) and the hydroxyl groups (OH), ranges from 1 to 1.3;
   ii. a sodium phosphate of a $C_{10}$-$C_{20}$ ethoxylated alcohol with 1-30 moles of ethylene oxide;
   iii. a benzyl or benzyl alkyl sulfate/sodium sulfonate, wherein the alkyl group has from 5 to 20 carbon atoms;
   iv. a chloride of ammonium alkyl-benzyl (aqueous solution) for example benzalconium chloride;
   v. an ester of fatty acids of coconut oil with choline chloride; and
3) thermally treating the beads with hot air at a temperature ranging from 30 to 60° C., preferably at 50° C.

The thermal treatment of the beads in the presence of the lubricating additives improves the insulating capacity of the expanded product obtained therefrom by an average of 10% with respect to that of the same expanded product from non-thermally treated beads.

According to the present invention, the preparation of the beads of expandable vinyl aromatic polymers can be effected by the polymerization in aqueous suspension of one or more vinyl aromatic monomers, possibly together with at least one polymerizable comonomer in a quantity of up to 50% by weight, in the presence of the athermanous additive and in the presence of a peroxide radicalic initiator, optionally containing at least one aromatic ring, and an expansion agent added before, during or at the end of the polymerization.

The polymerization is carried out in aqueous suspension with inorganic salts of phosphoric acid, for example tricalcium phosphate or magnesium phosphate. Sodium tricalcium phosphate is preferred. These salts can be added to the polymerization mixture either already finely subdivided or synthesized in situ by reaction, for example, between sodium pyrophosphate and magnesium sulfate. These inorganic salts are coadjuvated by additives known to experts in the field, such as anionic surface-active agents, for example sodium dodecylbenzenesulfonate or sodium metadisulfite, as described in U.S. Pat. No. 3,631,014. The polymerization can also be carried out in the presence of organic suspending agents such as polyvinyl pyrrolidone, polyvinyl alcohol, etc., preferably in the presence of polyvinyl pyrrolidone.

The initiator system generally comprises two peroxides, the first with a halving time of one hour at 85-95° C. and the other with a halving time of one hour at 110-120° C. Examples of these initiators are benzoyl peroxide and ter-butyl perbenzoate.

The vinyl aromatic polymer, or copolymer, obtained has a molecular weight Mw ranging from 50,000 to 220,000, preferably from 70,000 to 200,000.

Generally, greater details on processes for the preparation of expandable vinyl aromatic polymers in aqueous solution, or more generally, on polymerization in suspension can normally be found in the Journal of Macromolecular Science, Review in Macromolecular Chemistry and Physics c31 (263) 215-299 (1991) or in international patent application WO 98/51734.

To enhance the stability of the suspension, it is possible to increase the viscosity of the reagent solution by dissolving a quantity of vinyl aromatic polymer therein, in a concentration ranging from 1 to 30% by weight, preferably from 5 to 20%, calculated with respect to the monomer alone. The solution can be obtained either by diluting a preformed polymer (for example fresh polymer or the waste products of previous polymerizations and/or expansions) in the reagent mixture or by pre-polymerizing the monomer, or mixture of monomers, in mass, until the above concentrations are reached, and then continuing the polymerization in aqueous suspension in the presence of the remaining additives.

During polymerization in suspension, polymerization additives, typically used for producing expandable vinyl aromatic polymers, are adopted, such as stabilizing agents of the suspension, chain transfer agents, expanding coadjuvants, nucleating agents, plasticizers, etc. and conventional polymer additives such as pigments, stabilizers, flame-retardant agents, antistatic agents, detaching agents, etc.

In particular, it is preferable to add flame-retardant agents during the polymerization, in a quantity ranging from 0.1% to 8% by weight, with respect to the weight of the resulting polymer. Flame-retardant agents particularly suitable for the expandable vinyl aromatic polymers, object of the present invention, are brominated aliphatic, cyclo-aliphatic, aromatic compounds such as hexabromocyclododecane pentabromomonochlorocyclohexane and pentabromophenyl allyl ether, preferably hexabromocyclododecane.

The expanding agents are preferably added during the polymerization phase and are selected from aliphatic or cyclo-aliphatic hydrocarbons containing from 3 to 6 carbon atoms such as n-pentane, isopentane, cyclopentane or their mixtures, preferred is a mixture of n-pentane and isopentane; halogenated derivatives of aliphatic hydrocarbons containing from 1 to 3 carbon atoms such as, for example, dichlorodifluoromethane, 1,2,2-trifluoroethane, 1,1,2-trifluoroethane; carbon dioxide and water.

At the end of the polymerization, substantially spherical polymer beads are obtained, with an average diameter ranging from 0.2 to 2 mm, inside which all the additives, and in particular the athermanous additive, are homogeneously dispersed.

According to a further aspect of the present invention, the preparation of expandable vinyl aromatic polymer beads or granules can be effected by means of polymerization in mass and in continuous, which comprises the following steps in series:

i. feeding a vinyl aromatic polymer to an extruder, together with the athermanous additive and a nucleating agent selected from polyethylene waxes or polyamide waxes;

ii. heating the vinyl aromatic polymer to a temperature higher than the relative melting point;

iii. injecting the expanding agent and possible additives such as flame-retardant agents, into the molten polymer before extrusion through a die;

iv. forming expandable granules, through a die, in a substantially spherical form with an average diameter ranging from 0.4 to 2 mm, and v. re-baking the beads thus obtained to a temperature approximately the Tg of the polymer+expanding agent system, under pressure.

A detailed method for preparing vinyl aromatic polymers in mass and in continuous is provided in European patent EP 126,459.

At the end of the polymerization, whether it be carried out in suspension or in mass and in continuous, the expandable beads produced are discharged from the respective preparation units and washed, in continuous or batchwise, with water.

After drying with air at 23° C. for the time necessary for fluidizing them, generally ranging from 5 to 20' minutes, the beads are subjected to thermal pretreatment in the presence of one or more lubricating agents (i)-(v). The operation generally takes place in an oven etc. using the additive in quantities ranging from 0.005 to 0.05% by weight with respect to the total. Preferred additives according to the present invention are glycerin, ethylene glycol, preferably glycerin (i), hexyl-benzyl polyethoxy (10 moles) sodium phosphate, dodecyl-polyethoxy (10 moles) sodium phosphate, dodecyl-benzyl polyethoxy (10 moles) sodium phosphate, preferably dodecyl-polyethoxy (10 moles) sodium phosphate (ii), dodecyl-benzene sodium sulfonate, sodium hexabenzenesulfonate, sodium dodecylsulfate, 2-ethylhexyl-sodium sulfate (iii), trimethyl-benzyl ammonium chloride, dimethylethyl-benzyl ammonium chloride, polydiallyldimethyl ammonium chloride, preferably benzalconiumchloride (iv), lauryl choline chloride, the ester of fatty acids of coconut oil with choline chloride (v). The addition with the lubricating agent is effected in continuous or batch Archimedean screw mixing devices, in rotating cones, rotating drums, blade mixers, etc.

Thanks to the thermal treatment in the presence of one or more lubricating agents, the expandable vinyl aromatic polymers thus prepared allow thermo-insulating articles to be prepared with a significant material saving or, for example, the preparation of sheets having a lesser thickness than those produced with traditional non-filled polymers, with a consequent saving in costs and also a reduction in volume and material.

Finally, the beads are subjected to the application of a coating. This essentially consists of a mixture of mono-, di- and tri-esters of glycerin (or other alcohols) with fatty acids, preferably stearic acid, and metallic stearates, such as zinc and/or magnesium stearates, also possibly mixed with carbon black.

A further object of the present invention relates to expandable vinyl aromatic polymers containing an athermanous additive which comprise:

a) a matrix obtained by polymerizing 50-100% by weight of one or more vinyl aromatic monomers and 0-50% by weight of at least one copolymerizable monomer;
b) 1-10% by weight, calculated with respect to the polymer (a), of an expanding agent englobed in the polymeric matrix;
c) 0.01-25% by weight, calculated with respect to the polymer (a), of a carbon black having an average diameter ranging from 30 to 2000 nm, a surface area ranging from 5 to 40 m$^2$/g, a sulfur content ranging from 0.1 to 1000 ppm and an ash content ranging from 0.001 to 1%;
d) 0-10% by weight, calculated with respect to the polymer (a), of graphite;
e) 0-10% by weight, calculated with respect to the polymer (a), of aluminum;
f) 0-10% by weight, calculated with respect to the polymer (a), of Antimonium trisulfide;
g) 0-10% by weight, calculated with respect to the polymer (a), of an inorganic derivative of silicon or magnesium;

with the provision that the sum of components (a)-(g) closes at 100 and that the concentration of the matrix (a) is not lower than 80% by weight and at least one of (d)-(g) is present.

The term "vinyl aromatic monomer", as used in the present description and claims, essentially refers to a product which corresponds to the following general formula:

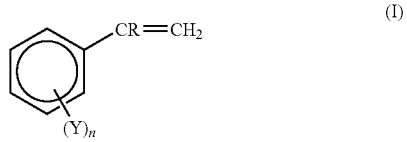

wherein R is a hydrogen or a methyl group, n is zero or an integer ranging from 1 to 5 and Y is a halogen, such as chlorine or bromine, or an alkyl or alkoxyl radical having from 1 to 4 carbon atoms.

Examples of vinyl aromatic monomers having the general formula defined above are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Preferred vinyl aromatic monomers are styrene and α-methylstyrene.

The vinyl aromatic monomers having general formula (I) can be used alone or in a mixture of up to 50% by weight with other copolymerizable monomers. Examples of these monomers are (meth)acrylic acid, $C_1$-$C_4$ alkyl esters of (meth) acrylic acid, such as methyl acrylate, methylmethacrylate, ethyl acrylate, ethylmethacrylate, isopropyl acrylate, butyl acrylate, amides and nitriles of (meth)acrylic acid such as acrylamide, methacrylamide, acrylonitrile, methacrylonitrile, butadiene, ethylene, divinylbenzene, maleic anhydride, etc. Preferred copolymerizable monomers are acrylonitrile and methylmethacrylate.

Any expanding agent capable of being englobed in the vinyl aromatic polymeric matrix, can be used in a combination with the expandable polymers object of the present invention. Typical examples are aliphatic hydrocarbons, freon, carbon dioxide, water, etc. mentioned above.

The carbon black filler has an average diameter ranging from 30 to 2000 nm, preferably from 100 to 1000, a specific surface ranging from 5 to 40 m$^2$/g, preferably from 8 to 20 m$^2$/g, (measured according to ASTM D-6556), a sulfur content ranging from 0.1 to 1000 ppm, preferably from 1 to 500 ppm, an ash residue ranging from 0.001 to 1%, preferably from 0.01 to 0.3% (measured according to ASTM D-1506), a loss with heat (measured according to ASTM D-1509) ranging from 0.001 to 1%, preferably from 0.01 to 0.5%, a DBPA (measured according to ASTM D-2414) of 5-100 ml/(100 g), preferably 20-80 ml/(100 g) and an iodine number (measured according to ASTM D-1510) ranging from 0.01 to 30 g/kg, preferably from 0.01 to 20 g/kg, very preferably from 0.1 to 10 g/kg. Said filler can be added to the vinyl aromatic polymer either by means of polymerization in suspension or by means of the continuous mass technology, in such quantities as to give a final concentration in the polymer of 0.01 to 25% by weight, preferably from 0.01 to 20, very preferably from 0.1 to 5%.

The carbon black used in the present invention can be prepared according to the following main technologies:
furnace process (partial combustion of a liquid containing aromatic hydrocarbons);
thermal black process (method based on the decomposition of natural gas or liquid hydrocarbons in the absence of air or flame);
acetylene black process (thermal decomposition process, 800-1000° C., at atmospheric pressure);
lampblack process (combustion of various liquids or raw materials in the absence of air).

Greater details can be found, for example, in the Kirk-Othmer encyclopaedia, edition 4, volume 4.

The natural or synthetic graphite can have a size ranging from 1 to 50 μm, preferably from 2 to 13 μm, with a specific area of 5-20 m$^2$/g. An example is the product of Fluka having a diameter of 5 μm. The graphite can also be of the expandable type.

The aluminum is preferably in the form of small plates and 90% of the particles have a maximum length of 15 μm. An example is the Schlenk product—FM/6500 with an average size of 4 μm. Surface treated aluminum flakes can also be used to improve its dispersability in the monomeric phase and increase its resistance to water.

The antimonium trisulfide is preferably in the form of small plates or spheres and can have a size ranging from 1 to 80 μm. An example is the Fluka product with an average diameter of 30 μm.

The silicon derivative is a product of the clay family, such as kaolinite and talc, micas, clays and montmorillonites. The silicon derivative is preferably talc in a spheroidal form and can have a size ranging from 5 to 50 μm. An example is the product TL-16 of Teloon Chemicals with a size of 16 μm.

The magnesium derivative is preferably hydrotalcite and an example is DHT-4 of Kiowa Chem.

At the end of the addition of the athermanous filler, an expandable polymer is obtained, which can be transformed to produce expanded articles having a density ranging from 5 to 50 g/l, preferably from 10 to 25 g/l. These materials also have an excellent thermal insulation capacity expressed by a thermal conductivity ranging from 25 to 50 mW/mK, preferably from 30 to 45 mW/mK (measured according to standard ISO 8301) which is generally lower than that of equivalent non-filled expanded materials currently on the market, for example EXTIR A-5000 of Polimeri Europa S.p.A.

Some illustrative and non-limiting examples are provided for a better understanding of the present invention and for its embodiment.

EXAMPLE 1 (COMPARATIVE)

A mixture of 150 parts by weight of water, 0.2 parts of sodium pyrophosphate, 100 parts of styrene, 0.0020 parts of N,N'-bis-(2-hydroxyethyl) stearyl amine, 0.30 parts of benzoyl peroxide, 0.25 parts of ter-butyl perbenzoate and 1 part of carbon black T990 sold by the company CONTINENTAL CARBON of Houston—Tex. (USA) with an average diameter of about 362 nm, a BET of 10 $m^2/g$, an ash content of 0.02%, a sulfur content equal to 60 ppm, a loss with heat of 0.1%, a DBPA number of 44 ml/(100 g), are charged into a stirred closed container. The mixture is heated to 90° C. under stirring.

After about 2 hours at 90° C., 4 parts of a solution at 10% of polyvinylpyrrolidone are added. The mixture is heated, still under stirring, for a further 2 hours to 100° C., 7 parts of a 70/30 mixture of n-pentane and i-pentane are added, the mixture is heated for a further 4 hours to 125° C., it is then cooled and the batch discharged.

The beads of expandable polymer thus produced are subsequently recovered, washed, dried in a stream of air at 23° C., 0.02% of non-ionic surface active-agent consisting of a condensate of ethylene oxide and propylene oxide on a glycerin base, sold by Dow (Voranol CP4755), are added, and screened separating the fraction with a diameter ranging from 1 to 1.5 mm.

This fraction proved to be 40%, a 30% fraction being between 0.5 and 1 mm, a 15% fraction between 0.2 and 0.5 mm and the gross fraction of 15%, between 1.5 and 3 mm.

0.2% of glyceryl monosterate and 0.01% of zinc stearate are then added to the fraction of 1 to 1.5 mm.

The product is pre-expanded with vapour at a temperature of 100° C., aged for a day and used for the moulding of blocks (dimensions: 1040×1030×550 mm).

The blocks were then cut to prepare flat sheets on which the thermal conductivity was measured. The thermal conductivity was 35.2 mW/mK whereas that of a sheet having the same density (17 g/l) prepared with a traditional reference product (EXTIR A-5000), was 42.5 mW/mK.

A part of the sieved fraction between 1 and 1.5 mm is thermally treated with air at 50° C. for 1 h. 0.2% of glyceryl monosterate and 0.01% of zinc stearate are then added to the beads. The product is pre-expanded with vapour at a temperature of 100° C., aged for a day and used for the moulding of blocks (dimensions: 1040×1030×550 mm).

The blocks were then cut to prepare flat sheets on which the thermal conductivity was measured. The thermal conductivity was 35 mW/mK.

EXAMPLE 2

Example 1 is repeated until the drying of the beads with air at 23° C. 0.02% of a sodium phosphate of an ethoxylated $C_{12}$ alcohol with 10 moles of EO (Forlanit of Cognis) are then added to the beads which are subsequently sieved, separating the fraction with a diameter ranging from 1 to 1.5 mm.

0.2% of glyceryl monosterate and 0.01% of zinc stearate are then added to a part of the fraction of 1 to 1.5 mm.

The product is pre-expanded with vapour at a temperature of 100° C., aged for a day and used for the moulding of blocks (dimensions: 1040×1030×550 mm).

The blocks were then cut to prepare flat sheets on which the thermal conductivity was measured. The thermal conductivity was 35.3 mW/mK (density=17 g/l).

The other part of the fraction between 1 and 1.5 mm is subsequently thermally treated with air at 50° C. for 1 h, and 0.2% of glyceryl monosterate and 0.01% of zinc stearate are then added.

The product is subsequently processed using the same procedure as Example 1 (density=17 g/l). The thermal conductivity dropped to 33 mW/mK.

EXAMPLE 3

Example 2 is repeated until the drying of the beads with air at 23° C. 0.02% of glycerin are then added to the beads.

The beads of expandable polymer thus produced are processed as in Example 1, separating the fraction ranging from 1 to 1.5 mm.

The fraction between 1 and 1.5 mm is subsequently thermally treated with air at 50° C. for 1 h and processed as in Example 1. The thermal conductivity proved to be 33.3 mW/mK.

EXAMPLE 4

A mixture of 150 parts by weight of water, 0.2 parts of sodium tricalciumphosphate (TCP), 100 parts of styrene, 0.0020 parts of N,N'-bis-(2-hydroxyethyl) stearyl amine, 0.30 parts of benzoyl peroxide, 0.25 parts of ter-butyl perbenzoate, 1 part of carbon black used in Example 1 and 1 part of graphite, are charged into a stirred closed container. 0.7% of hexabromocyclododecane and 0.25% of dicumylperoxide are added together with the styrene to made the product fireproof. The mixture is heated to 80° C. under stirring. 15 ppm of sodium metabisulfite are added and the heating is continued to 90° C.

After 3 hours at 90° C., 0.3% of TCP are added, followed by 7 parts of a 70/30 mixture of n-pentane and i-pentane, the mixture is heated for a further 4 h to 125 C, cooled and discharged.

The beads of expandable polymer thus produced are washed, dried, Forlanit is then added as in Example 2, and sieved, separating the fraction ranging from 1 to 1.5 mm.

This fraction proved to be 70%, a 10% fraction being between 0.5 and 1 mm, a 5% fraction between 0.2 and 0.5 mm and the gross fraction of 15%, between 1.5 and 3 mm.

0.2% of glyceryl monosterate and 0.01% of zinc stearate are then added to a part of the fraction of 1 to 1.5 mm, which is processed as described in Example 1. The thermal conductivity proved to be equal to 34.3 mW/mK.

The other part of the fraction of 1 to 1.5 mm is thermally treated with air at 50° C. for 1 hour and processed as described in Example 1. The thermal conductivity dropped to 32.7 mW/mK and the test sample passed the fire test according to the regulation DIN 4102.

EXAMPLE 5

Example 4 was repeated substituting the graphite with 1% of antimonium sulfide of Fluka (diameter=30 μm). The thermal conductivity was evaluated analogously to Example 4 on the 1-1.5 mm fraction, dried with air at 23° C., and proved to be 34.4 mW/mK. The thermal conductivity on the 1-1.5 mm fraction thermally treated proved to be equal to 32.5 mW/mK.

EXAMPLE 6

Example 4 was repeated substituting the graphite with 1% of aluminum plates FM6500 of Schlenk (nominal diameter=4 μm). The thermal conductivity was evaluated, analogously to Example 4, on the 1-1.5 mm fraction dried with air at 23° C., and proved to be 34.2 mW/mK. The thermal conductivity on the 1-1.5 mm fraction thermally treated dropped to 32.1 mW/mK.

The invention claimed is:

1. Expandable vinyl aromatic polymers containing an athermanous additive which comprise:

a) a matrix obtained by polymerizing 50-100% by weight of one or more vinyl aromatic monomers and 0-50% by weight of at least one copolymerizable monomer;
b) 1-10% by weight, calculated with respect to the polymer (a), of an expanding agent embedded in the polymeric matrix;
c) 0.01-25% by weight, calculated with respect to the polymer (a), of a carbon black having an average diameter ranging from 30 to 2000 nm, a surface area ranging from 5 to 40 m$^2$/g, a sulfur content ranging from 0.1 to 1000 ppm and an ash content ranging from 0.001 to 1%;
d) 0-10% by weight, calculated with respect to the polymer (a), of graphite;
e) 0-10% by weight, calculated with respect to the polymer (a), of aluminum;
f) 0-10% by weight, calculated with respect to the polymer (a), of antimonium trisulfide;
g) 0-10% by weight, calculated with respect to the polymer (a), of hydrotalcite or of an inorganic silicon compound;
wherein the sum of components (a)-(g) is 100%, the concentration of the matrix (a) is not lower than 80% by weight, and at least one of (d)-(g) is present.

2. The vinyl aromatic polymers according to claim 1, wherein the carbon black filler has an average diameter ranging from 100 to 1000 nm, a specific surface ranging from 8 to 20 m$^2$/g measured according to ASTM D-6556, a sulfur content ranging from 1 to 500 ppm, an ash residue ranging from 0.01 to 0.3% measured according to ASTM D-1506, a loss with heat measured according to ASTM D-1509 ranging from 0.001 to 1%, a DBPA measured according to ASTM D-2414 of 5-100 ml/(100 g), and an iodine number measured according to ASTM D-1510 ranging from 0.01 to 30 g/kg.

3. The vinyl aromatic polymers according to claim 1, wherein the graphite is natural or synthetic and has a dimension ranging from 1 to 50 μm, with a specific area of 5-20 m$^2$/g.

4. The vinyl aromatic polymers according to claim 1, wherein the graphite is an expandable graphite.

5. The vinyl aromatic polymers according to claim 1, wherein the aluminum is in the form of small plates and 90% of the plates have a maximum length of 15 μm.

6. The vinyl aromatic polymers according to claim 1, wherein the antimonium trisulfide is in the form of small plates or spheres and has a dimension ranging from 1 to 80 μm.

7. The vinyl aromatic polymers according to claim 1, wherein the silicon compound is a product of the clay family.

8. The vinyl aromatic polymers according to claim 1, wherein the silicon compound is talc in spheroidal form and has a dimension ranging from 5 to 50 μm.

9. The vinyl aromatic polymers according to claim 1, wherein the vinyl aromatic monomer is styrene or α-methylstyrene.

10. Expanded articles having a density ranging from 5 to 50 g/l, having a thermal conductivity ranging from 25 to 50 mW/mK obtained after expansion, at a temperature slightly higher than the glass transition temperature of the polymer, of beads of vinyl aromatic polymers according to claim 1.

11. The vinyl aromatic polymers according to claim 1, wherein the silicon compound comprises kaolinite, talc, mica, clay or montmorillonite.

* * * * *